No. 696,522. Patented Apr. 1, 1902.
H. A. WAHLERT.
BRAKE SLACK ADJUSTER.
(Application filed Aug. 3, 1901.)
(No Model.)
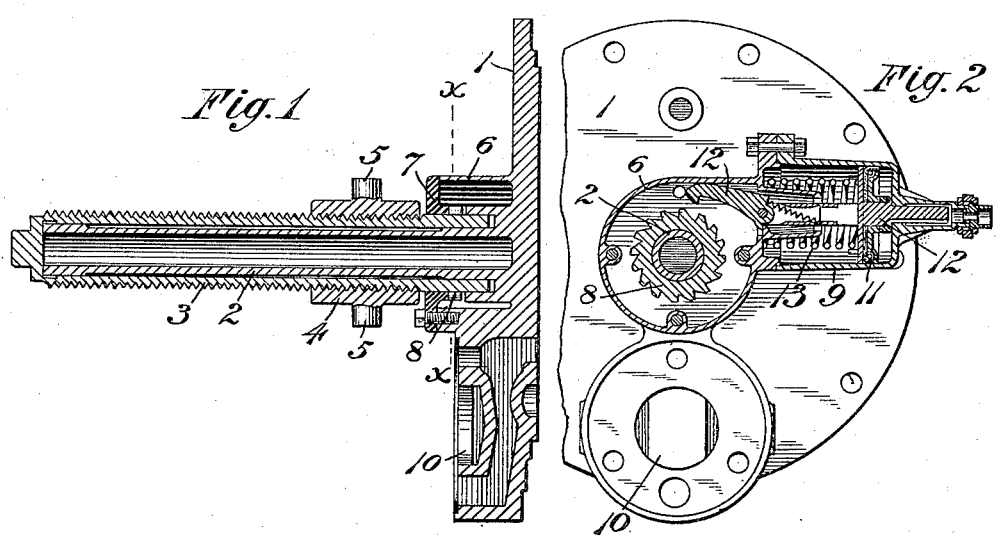
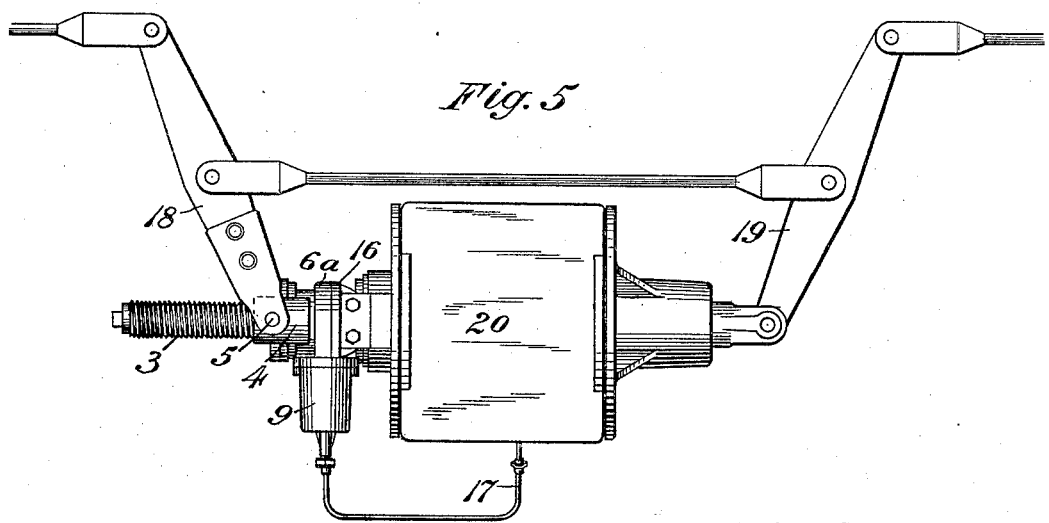
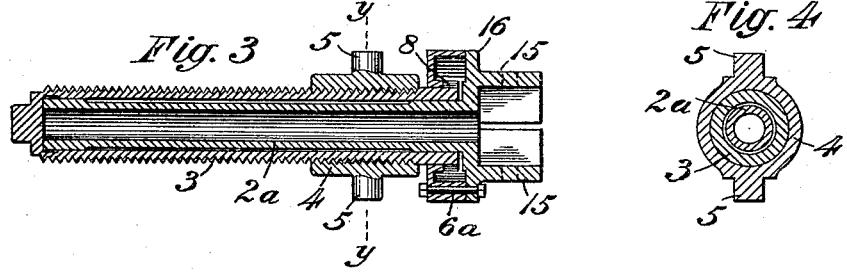
WITNESSES:
Jas. B. MacDonald
J. S. Custer
INVENTOR,
Henry A. Wahlert
by C. H. Wright Att'y.
THE NORRIS PETERS CO., PHOTO-LITHO., WASHINGTON, D. C.

United States Patent Office.

HENRY A. WAHLERT, OF ST. LOUIS, MISSOURI, ASSIGNOR TO THE AMERICAN BRAKE COMPANY, OF ST. LOUIS, MISSOURI, A CORPORATION OF MISSOURI.

BRAKE SLACK-ADJUSTER.

SPECIFICATION forming part of Letters Patent No. 696,522, dated April 1, 1902.

Application filed August 3, 1901. Serial No. 70,754. (No model.)

*To all whom it may concern:*

Be it known that I, HENRY A. WAHLERT, a citizen of the United States, residing in the city of St. Louis, State of Missouri, have invented or discovered a certain new and useful Improvement in Brake Slack-Adjusters, of which improvement the following is a specification.

My invention relates to slack-adjusters for railway-brakes, and has for its object to provide an improved construction of take-up mechanism adapted to be supported on the head of the brake-cylinder.

My invention comprises a tubular adjusting-screw and a support upon which the screw is rotatably mounted, secured to the head of the brake-cylinder.

It also consists in certain combinations and arrangement of parts, as hereinafter more fully set forth.

In the accompanying drawings, Figure 1 is a longitudinal section of a brake-cylinder head, showing one form of my improved construction secured thereto. Fig. 2 is a transverse section taken on the line $x\ x$ of Fig. 1. Fig. 3 is a longitudinal section showing a modification of my improvement. Fig. 4 is a transverse section taken on the line $y\ y$ of Fig. 3; and Fig. 5 is a plan view of a brake-cylinder and cylinder-levers, showing my improvement applied thereto.

Referring to Figs. 1 and 2, the brake-cylinder 1 is provided with a long cylindrical extension 2, cast integral therewith, and on this cylindrical extension is rotatably mounted the tubular adjusting-screw 3, having the ratchet-wheel 8 secured thereon. The ratchet-casing 6 may also be cast integral with the cylinder-head and is provided with a cover 7, which is secured to the casing outside of the ratchet-wheel, so that the side of the ratchet-wheel bears against the inner side of said cover, thus holding the screw against longitudinal movement. The interiorly-threaded fulcrum-block 4 is mounted on the screw 3 and has oppositely-projecting pins 5, on which the bifurcated end of the dead cylinder-lever 18 is pivoted.

In Figs. 3, 4, and 5 I have shown the cylindrical support $2^a$ provided with a circular base 16 and flanges 15, by which it may be bolted to a suitable lug on the head of the brake-cylinder. In this case the ratchet casing or cover $6^a$ is secured to the base 16.

For operating the ratchet-wheel I have shown a take-up motor 9, having piston 11, piston-stem 14, pawl 12, and spring 13, supported on the ratchet-casing; but it is to be understood that my invention is not limited to any particular form of take-up motor, nor do I claim this specific form of take-up motor in this application, as it is included in the subject-matter covered by another copending application, Serial No. 70,753, filed of even date herewith.

I have illustrated my device as applied to the ordinary form of passenger-car brake-rigging, having brake-cylinder 20, cylinder-levers 18 and 19, and the head of the brake-cylinder being provided with seat 10 for the triple valve of the air-brake system.

When the brakes are applied and the piston of the brake-cylinder moves beyond the point at which the pressure-pipe 17 is connected, the piston 11 of the take-up motor will be actuated by air from the brake-cylinder and the pawl 12 will engage with the teeth of the ratchet-wheel 8. Then when the brakes are released the spring 13 will return the piston and pawl to the normal position, thus revolving the screw 3 and causing the fulcrum-block of the cylinder-lever 18 to be adjusted. This operation is repeated as often as necessary to maintain a constant travel of the piston of the brake-cylinder.

Having now described my invention, what I claim as new, and desire to secure by Letters Patent, is—

1. In a brake slack-adjuster, the combination with a brake-cylinder head having a support secured thereto, of a tubular adjusting-screw rotatably mounted upon said support, said screw having a ratchet-wheel and a threaded fulcrum-block.

2. In a brake slack-adjuster, the combination with a tubular adjusting-screw and a support on which said screw is rotatably mounted adapted to be secured to the head of the brake-cylinder, of a threaded fulcrum-block, a ratchet-wheel secured to said screw and means for operating said ratchet-wheel.

3. In a brake slack-adjuster, the combination with a cylindrical support adapted to be secured to the head of a brake-cylinder, of a tubular adjusting-screw sleeved upon said support and having a ratchet-wheel and a threaded fulcrum-block.

4. In a brake slack-adjuster, the combination with an externally-threaded hollow screw, a movable fulcrum-block and a ratchet device for operating said screw, of a support extending into the hollow screw, and means for operating the ratchet.

5. In a brake slack-adjuster, the combination with a hollow adjusting-screw and a ratchet for operating the same, of a relatively movable fulcrum-block, and a support on which said screw is rotatably mounted.

6. In a brake slack-adjuster, the combination with a brake-cylinder head having a support extending therefrom, of a hollow adjusting-screw sleeved upon said support and having a movable fulcrum-block and a ratchet device for operating said screw.

In testimony whereof I have hereunto set my hand.

HENRY A. WAHLERT.

Witnesses:
JAS. B. MACDONALD,
E. A. WRIGHT.